J. B. POWLES.
VALVE FOR BUNG VENTS.
APPLICATION FILED FEB. 21, 1918.
1,300,011.
Patented Apr. 8, 1919.
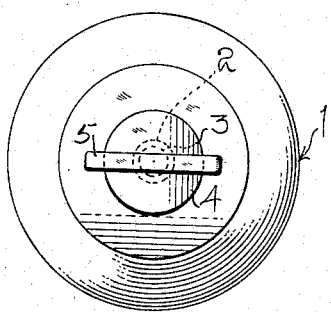
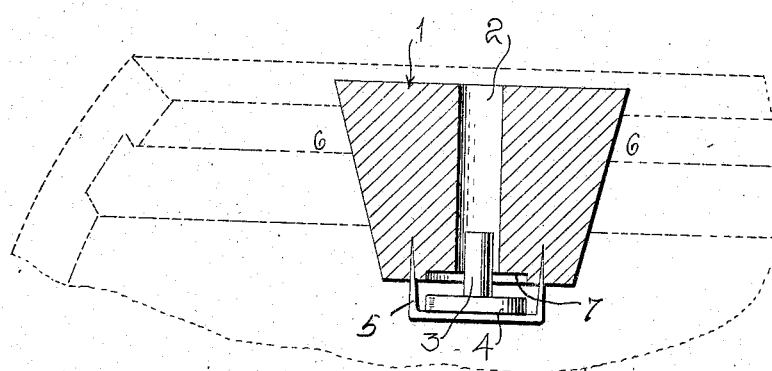
Inventor
John B. Powles
By Mason Fenwick & Lawrence,
Attorneys

UNITED STATES PATENT OFFICE.

JOHN B. POWLES, OF SEATTLE, WASHINGTON.

VALVE FOR BUNG-VENTS.

1,300,011.     Specification of Letters Patent.     Patented Apr. 8, 1919.

Application filed February 21, 1918. Serial No. 218,565.

*To all whom it may concern:*

Be it known that I, JOHN B. POWLES, a citizen of the United States, residing at 821 Western avenue, Seattle, in the county of King and State of Washington, have invented certain new and useful Improvements in Valves for Bung-Vents; and I do hereby declare the following to be a full, clear, and exact description of the invention, such as will enable others skilled in the art to which it appertains to make and use the same.

This invention relates to valves for bung vents, and particularly to valves which act automatically as may be desired to open and close the vent hole in a bung or plug to be used in a cask for liquid, and more especially for use where the cask contains fruit juice or liquid which would be subject to rapid fermentation, if not provided with an air inlet.

In my experience in handling liquids, and particularly fruit juices such as apple cider, I have learned that such juices and particularly cider is less likely to ferment and become "hard" and form alcohol, if the liquid is provided with free contact with fresh air, and as it is frequently necessary to move and transport vessels and casks containing new or fresh cider, it is important to provide a suitable bung or stopper which will permit air to enter the cask and at the same time will prevent the ready escape of the liquid when the cask is tipped or rolled and the bung so positioned in the moving that the liquid would escape through the air vent unless the vent was provided with a suitable automatic valve.

As many of the States have passed laws which prevent the sale and transportation within their borders of alcoholic liquors, it is becoming very important, that fruit juices should be held and maintained in their natural state and without fermentation, and to accomplish the above objects, I have invented the following described device.

Figure 1 represents a plan view of the small end of a cask bung or plug, with valve attachment.

Fig. 2 represents a longitudinal section of the plug.

Like numerals on the figures refer to like parts of the device.

1 represents the bung or plug, which is used for closing the bung hole or any aperture in a cask or vessel used to hold liquids, and particularly fermentable fruit juices; 2 represents a vent hole passing through the plug, and 3 is a valve stem fitting loosely within the vent hole and provided with a wide valve disk or flange 4 which extends over the inner mouth of the vent tube. The valve moves freely by gravity or pressure according to the position of the plug and cask and when in the position shown in Fig. 2 which is the usual position of the keg the valve would be open.

Any suitable guard 5 is provided to prevent the valve working out from its position on the top head of the cask. When the valve is closed, the flange 4 rests upon the depressed seat 7 on the inner surface of the plug.

In use, the plug 1 is driven into the head of the cask or other vessel after the same has been filled with cider or other liquid to which is desirable that air should have access, and the plug is preferably of such size that it will become tight when it reaches the line 6 across the same at the surface of the cask. This plug is particularly useful for barrels or casks which are filled for transportation, and is then driven into the holes in the head of the cask, as in transportation they are most frequently placed on end, and as the vented plug is in the upper end of the cask, the contents of the cask which may to some extent escape from the cask, cannot run back with other undesirable unsanitary matter, because of the crown of the plug 1 protruding above the barrel head, represented by the line 6.

As will be readily understood, from the foregoing description the plug will be in such position when driven through the top portion of the cask, that the valve will fall down against the guard 5, (shown as a simple square headed staple in the drawings) so that air may pass freely by the stem 3 through the vent 2 in and out of the cask and so ventilate the liquid as desired. When the cask is turned in such position that the plug will protrude either from the side or bottom portion thereof, then the pressure of the liquid within will cause the valve to close up against its seat 7 and to a large degree prevent any leakage of the liquid, but in practice it is not necessary that the vent be perfectly tight unless the cask lies with the valve in a lowered position for a long period.

This device is constructed from cheap material, largely from stock articles such as ordinary galvanized rivets for valves, and wire staples for guards, and any ordinary bungs with vent holes bored through.

When the bung valve is set into the head of a keg, the top end of the plug preferably projects above the surface of the keg and thus effectually prevents the inflow of any fluids which may happen to collect upon the surface adjacent the bung hole.

What is claimed is:

1. The combinations, with a keg having a head with a bung hole, of a bung or plug with an aperture for venting the keg, a rivet-like valve having its stem disposed in the aperture, and its head arranged below the inner face of the plug, and a stop limiting the movement of the head of the valve away from the plug face.

2. A self-venting plug for kegs comprising in combination with the plug; a common rivet forming a valve and having its stem playing in an aperture in the plug and its head engageable with the adjacent end face of the plug; and a common staple bridging the valve head and driving in the end of the plug.

3. A self-venting plug for kegs comprising in combination with the plug; a common-rivet-like piece forming a valve and having its stem playing in an aperture in the plug and its head engageable with the adjacent end face of the plug; and a common staple bridging the valve head and driven in the end of the plug.

In testimony whereof I affix my signature.

JOHN B. POWLES.

Copies of this patent may be obtained for five cents each, by addressing the "Commissioner of Patents, Washington, D. C."